(12) United States Patent
Ocelic et al.

(10) Patent No.: US 7,738,115 B2
(45) Date of Patent: Jun. 15, 2010

(54) OPTICAL DEVICE FOR MEASURING MODULATED SIGNAL LIGHT

(75) Inventors: Nenad Ocelic, Munich (DE); Rainer Hillenbrand, Prittriching (DE)

(73) Assignee: Max-Planck-Gesellschaft zur Forderung der Wissenschaften e.V. (DE)

( * ) Notice: Subject to any disclaimer, the term of this patent is extended or adjusted under 35 U.S.C. 154(b) by 254 days.

(21) Appl. No.: 11/997,386

(22) PCT Filed: Sep. 27, 2006

(86) PCT No.: PCT/EP2006/009397

§ 371 (c)(1),
(2), (4) Date: Jan. 30, 2008

(87) PCT Pub. No.: WO2007/039210

PCT Pub. Date: Apr. 12, 2007

(65) Prior Publication Data

US 2008/0285041 A1    Nov. 20, 2008

(30) Foreign Application Priority Data

Sep. 30, 2005  (EP) .................................. 05021500

(51) Int. Cl.
*G01B 11/02* (2006.01)
(52) U.S. Cl. ..................................... 356/501
(58) Field of Classification Search .................. 356/501
See application file for complete search history.

(56) References Cited

U.S. PATENT DOCUMENTS 5,565,987 A * 10/1996 Jain et al. .................... 356/501

(Continued)

FOREIGN PATENT DOCUMENTS

DE    100 35 134 A1    7/2000

(Continued)

OTHER PUBLICATIONS

Hillenbrand and Keilmann, "Complex Optical Constants on a Subwavelength Scale," Oct. 2, 2000, Phys. Rev. Letters, vol. 85, No. 14, pp. 3029-3032.*

(Continued)

*Primary Examiner*—Gregory J Toatley, Jr.
*Assistant Examiner*—Scott M Richey
(74) *Attorney, Agent, or Firm*—DLA Piper LLP (US)

(57) ABSTRACT

An optical device for determining at least one signal light component being characteristic for an optical near-field interaction of a probe with an object to be investigated, wherein the near-field interaction is subjected to a fundamental modulation at a fundamental frequency $\Omega$, comprises an interferometer device with an illumination light path (I) being directed to the probe, a reference light path (II) being directed to a detector device for obtaining detector output signals including signal light components, and a signal light path (III) being directed from the probe to the detector device, wherein the reference and signal light paths (II, III) are superimposed at the detector device, and a demodulation device for determining the signal light components by demodulating the detector output signals, wherein the reference light path (II) does not contain the probe, an interferometer phase modulator is arranged in the reference light path (II) or signal light path (III) for changing an interferometer phase comprising the optical phase difference between the reference light and the signal light, and the demodulation device is adapted for determining the signal light components from the detector output signals obtained at three or more different interferometer states, which represent three or more different interferometer phases or at least two different interferometer phases with at least one state wherein the reference light path (II) is blocked.

30 Claims, 6 Drawing Sheets

U.S. PATENT DOCUMENTS

| | | | |
|---|---|---|---|
| 5,623,339 A * | 4/1997 | Wickramasinghe et al. | 356/501 |
| 5,939,709 A * | 8/1999 | Ghislain et al. | 250/216 |
| 6,144,028 A * | 11/2000 | Kley | 250/234 |
| 6,229,609 B1 * | 5/2001 | Muramatsu et al. | 356/601 |
| 6,337,479 B1 * | 1/2002 | Kley | 250/234 |
| 6,643,012 B2 * | 11/2003 | Shen et al. | 356/301 |
| 6,650,420 B2 * | 11/2003 | Houston et al. | 356/501 |
| 6,718,821 B1 * | 4/2004 | Houston et al. | 73/105 |
| 6,985,223 B2 * | 1/2006 | Drachev et al. | 356/301 |
| 7,545,508 B2 * | 6/2009 | Kawakatsu | 356/501 |
| 2002/0021451 A1 | 2/2002 | Hill | |
| 2002/0135755 A1 * | 9/2002 | Kley | 356/72 |
| 2005/0259252 A1 * | 11/2005 | Hillenbrand et al. | 356/326 |
| 2006/0162455 A1 * | 7/2006 | Kawakatsu | 73/579 |
| 2008/0047335 A1 * | 2/2008 | Kawasaki et al. | 73/105 |
| 2008/0049236 A1 * | 2/2008 | Iyoki et al. | 356/614 |
| 2008/0266575 A1 * | 10/2008 | Gaitas et al. | 356/600 |
| 2009/0021747 A1 * | 1/2009 | Kawasaki et al. | 356/501 |
| 2009/0249521 A1 * | 10/2009 | Dazzi et al. | 850/33 |

FOREIGN PATENT DOCUMENTS

DE    10035134  A1 *  2/2002

OTHER PUBLICATIONS

Taubner T. et al., "Performance of Visible and Mid-Infrared Scattering-Type Near-Field Optical Microscopes," Journal of Microscopy Blackwell Science UK, vol. 210, Jun. 2003, pp. 311-314, XP002362724 ISSN: 0022-2720.

Totzeck M., "Near-Field Imaging with a Waveguide Resonator Probe in Collection and Reflection Mode: I. Microwave Measurements and Resolving Power," Pure and Applied Optics, Bristol, GB, vol. 3, No. 5, Sep. 1, 1994, pp. 867-877, XP000672011 ISSN: 0963-9659.

* cited by examiner

OPTICAL DEVICE FOR MEASURING MODULATED SIGNAL LIGHT

RELATED APPLICATION

This is a §371 of International Application No. PCT/EP2006/009397, with an international filing date of Sep. 27, 2006 (WO 2007/039210 A1, published Apr. 12, 2007), which is based on European Patent Application No. 05021500.3 filed Sep. 30, 2005.

TECHNICAL FIELD

The present invention relates to an optical device for amplitude and/or phase sensitive measurement of modulated signal light components being characteristic for an optical near-field interaction of a probe with an object to be investigated, wherein the near-field interaction is subjected to a fundamental modulation at a fundamental frequency. In particular, the present invention relates to an optical device for measurement of signal light collected with an optical near-field microscope, wherein the near-field interaction is subjected to the modulation e.g. by a mechanical oscillation of at least one of the probe and the object. Furthermore, the present invention relates to a method of determining at least one component of modulated signal light being characteristic for an optical near-field interaction of a probe with an object to be investigated.

TECHNICAL BACKGROUND

There exist a wide variety of materials displaying interesting optical properties on a scale ranging from hundreds down to single nanometres. Some examples include viruses, cells, polymer blends, polycrystalline and nanocomposite materials, quantum dots, electronic components such as transistors and memory cells. None of these structures can be directly resolved by conventional optical microscopy due to the resolution limit imposed by the diffraction of light. This limit is formally expressed by Abbe's law ($d \approx 0.5\lambda/N_A$) where d is the lateral resolution, $\lambda$ is the light wavelength and $N_A$ numerical aperture of the microscope objective. Similarly, the light cannot be focused to a disk of radius smaller then roughly half the wavelength.

A first way around the diffraction limit was obtained with a spatial confinement of the light source with aperture-type near-field optical microscopes (a-SNOM). This could be realised by opening a small (subwavelength-sized) aperture in an otherwise opaque screen. To avoid the diffraction effects, the sample has to be placed in the immediate vicinity of the aperture. Usually, the intensity of light transmitted through or reflected from the sample is recorded. Phase sensitivity can also be achieved e.g. by sinusoidal phase modulation of the measurement wave (see M. Vaez-Iravani et al. in "Applied Physics Letters" vol. 62, 1993, p. 1044).

The resolution of an a-SNOM is limited by the size of the aperture. The transmission efficiency of a small aperture rapidly decreases with decreasing size to wavelength ratio. This limits the smallest practical aperture sizes to roughly 50 nm for the visible light and to hundreds of nanometres or more for infrared radiation.

To improve the resolution even further, the apertureless or scattering-type near-field microscope (s-SNOM) was developed. In s-SNOM, a sharp, usually metallic tip is dithered in the proximity of the sample and illuminated by the focused light. The light scattered by the tip is collected since it conveys the information on the local optical properties of the sample. The presence of the sample modifies the scattered light amplitude and phase because the scattering depends not only on the tip alone, but on the polarizability of the entire coupled tip-sample system. The optical resolution of s-SNOM is essentially limited only by the tip radius. However, the largest part of the collected light does not originate from the tip apex. Instead, it is mostly produced by reflections and scatterings from the tip shaft and the entire illuminated area of the sample. This undesirable part of the signal, commonly referred to as background light, has to be separated from the measured quantities. Furthermore, to obtain the complex-valued dielectric constant of the sample both the amplitude and phase of the scattered light have to be determined.

The background signal can be avoided by taking advantage of the continuous tip oscillation. The tip dithering induces a periodic change in the coupled tip-sample system polarizability thus a modulation of the scattered wave S representing the signal light. However, the s-SNOM background B is also strongly modulated at the same frequency $\Omega$. The contrasts can be enhanced and scattering source S better distinguished from the background B if the signal is demodulated at a higher harmonic, $n\Omega$, n>1 (see G. Wurtz et al. in "The European Physical Journal —Applied Physics" vol. 5, 1999, 269).

The light intensity $I_n$ detected by the detector at frequency $n\Omega$, n>0 is in general a complicated sum of all possible signal and background interference products:

$$I_n = E_{S,n} E_{B,0} \cos(\phi_{S,n} - \phi_{B,0}) + E_{S,0} E_{B,n} \cos(\phi_{S,0} - \phi_{B,n}) + $$
$$\tfrac{1}{4} \Sigma_{i \neq 0, n} E_{S,i} E_{S,n \pm i} \cos(\phi_{S,i} - \phi_{S,n \pm i}) +$$
$$\tfrac{1}{4} \Sigma_{i \neq 0, n} E_{B,i} + E_{B,n \pm i} \cos(\phi_{B,i} - \phi_{B,n \pm i})) +$$
$$\tfrac{1}{2} \Sigma_{i \neq 0, n} E_{B,i} E_{S,n \pm i} \cos(\phi_{B,i} - \phi_{S,n \pm i})$$

where the $E_{S,i}$ and $E_{B,i}$ are the i-th harmonic components of the signal and background amplitudes and the $\phi_{S,i}$ and $\phi_{B,0}$ their corresponding phases. In practice it can be assumed $E_{B,0} \gg E_{S,i}$ and also $E_{B,0} \gg E_{B,i}$ for every $i \geq 1$. For a sufficiently high harmonic n, usually $n \geq 2$, we also have $E_{B,n} \approx 0$. The detected intensity is then simply $$I_n = E_{S,n} E_{B,0} \cos(\phi_{S,n} - \phi_{B,0})$$

However, this method provides no phase information and the measured quantity $I_n$ is dependent on the amplitudes of the background and the signal and the exact phase relation between them.

By combining the higher harmonic demodulation with an interferometric detection, the contribution of the background can be significantly reduced as the signal in this case contains one additional term, representing the interference product between the source S and the reference wave R:

$$I_n = E_{S,n}(E_{B,0} \cos(\phi_{S,n} - \phi_{B,0}) + E_R \cos(\phi_{S,n} - \phi_R))$$

Usually the reference ($E_R$) term is dominant. By effectively neglecting the background contribution ($E_{B,0} \ll E_R$) it was proposed by Taubner et al. ("Journal of Microscopy" vol. 210, 2003, p. 311) to reconstruct the amplitude and phase by measuring the signal twice (yielding signal amplitudes $s_1$ and $s_2$), with 90° reference phase shift between the measurements. With the known detector sensitivity a, the n-th harmonic amplitude $E_{S,n}$ and phase $\phi_{S,n}$ of the scattered waves are then reconstructed as:

$$E_{S,n} = sqrt(s_1^2 + s_2^2)/(aE_R)$$

$$\phi_{S,n} = \arctan(s_1, s_2)$$

In a typical s-SNOM experiment of the above type using infrared light with wavelength around 10 µm, the reference to background amplitude ratio $E_R : E_B$ ranging from 3 to 10 is observed. In an average case of $E_R : E_B = 5$ the above expressions lead to an error of up to 28% in the calculated amplitude $E_{S,n}$ and up to 17° in the phase $\phi_{S,n}$ compared to the exact values. Further, $E_{B,0}$ is unknown and generally not constant thus introducing artificial optical contrasts.

Finally, the adjustment of the interferometer is usually performed with a fixed reference phase. This often results in suboptimal alignment since the maximum in the detected intensity doesn't necessarily maximize the real signal amplitude, but only its projection on the reference wave (cosine component). It is therefore advantageous to measure the amplitude and phase simultaneously.

Phase sensitivity can also be achieved through an interferometric method proposed by Zenhausern et al. (EP 757 271). There it is also assumed that interferometric detection will enhance the detected signal intensity by several orders of magnitude by detecting a signal proportional to $(k\,r)^3$ instead of $(k\,r)^6$ in the Rayleigh scattering limit $k\,r \ll 1$, where k is the wave vector of the illuminating light and r is the radius of the scatterer. However, this assumption would only be correct in the absence of the background signal, which in reality amplifies the measured scattering signal the same way an interferometric reference does. As explained above, the additional amplification due to the interferometric detection is usually only a factor 10 or less over the background. In EP 757 271, this effect was not considered and consequently no way to eliminate the background contribution was proposed.

The first and so far the only method capable of both the background interference elimination and simultaneous amplitude and phase measurement was introduced by Hillenbrand et al. (DE 100 35 134). This method is based on the detection of scattering at higher harmonics nΩ of the tip dithering frequency, heterodyned with the reference wave shifted by a frequency Δ in respect to light used for tip and sample illumination. However, this heterodyne method can have the following shortcomings in practice: the frequency shift required for heterodyning is produced by an acousto-optic modulator (AOM) which separates the shifted beam by less than 100 mrad from the unshifted beam at its output. In such circumstances the Mach-Zender interferometer required by the method may be difficult to set up and align and the alignment of the frequency-shifted beam changes with the light wavelength. Furthermore, the AOM-s are commercially available for operation in only a few relatively narrow spectral regions, thus making the heterodyne method rather unsuitable for spectroscopic applications. Finally, the optical signal might be affected by the mechanical tip-sample interaction since the expression for the measured complex value of the signal $$z_n \sim E_{S,n} E_R e^{i(\phi_R - \phi_{S,n} + m\psi)}$$

explicitly depends on the variable phase ψ of the mechanical tip oscillation.

SUMMARY

An aspect of the invention is to provide an improved optical device for determining at least one modulated signal light component avoiding the disadvantages of existing techniques. In particular, the improved optical device should fulfill at least one of the following requirements: background suppression, broad spectral operation range, easy construction and adjustment and wavelength-independent alignment. Furthermore, an aspect of the invention is to provide an improved method for determining at least one modulated signal light component avoiding the disadvantages of conventional techniques.

These aspects are achieved with an optical device or a method comprising the features of claims 1 or 15. Exemplary embodiments of the invention are defined in the dependent claims.

DETAILED DESCRIPTION

According to a first aspect of the invention, the above is achieved with an optical device for determining at least one signal light component being characteristic for a modulated optical near-field interaction of a probe with an object. The optical device comprises an interferometer device and a detector device for detecting an interferometric superposition of the signal light with background light and reference light, wherein the interferometer device includes an interferometer phase modulator being arranged for changing an interferometer phase, and further comprises a demodulation device being adapted for determining signal light components from a plurality of detector signals obtained at three or more different interferometer states. The term "interferometer phase" refers to the optical phase difference between the reference light and the signal light.

According to a first alternative, the term "interferometer states" refers to conditions representing three or more different interferometer phases. In this case, the signal light components are determined from a plurality of detector signals obtained with at least three different interferometer phases. According to a second alternative, two of the interferometer states represent two different interferometer phases, while the third one represents a state wherein the reference light path is blocked.

Within the present specification, the term "light" generally refers to electromagnetic radiation covering the wavelength range from UV to microwave, i.e. 10 nm to 30 cm. The term "signal light" refers to a light being coherently influenced by the near-field interaction of the probe and an object under investigation. The signal light includes light components emitted or transmitted by the combination of the probe with the object under investigation. The terms "determining at least one component of the signal light" or "determining at least one signal light component" refer to measuring at least one of the amplitude and phase of at least one harmonic frequency component included in the signal light.

Embodiments of the invention present a new method for background-free measurement of the amplitude and/or phase of light coherently influenced, e.g. scattered by a subwavelength-sized source. This is achieved by the interferometer device with the simultaneous modulation of the signal and the interferometer phase.

Embodiments of the invention are based on an interferometer whose measurement arm contains the probe and the investigated object acting as a source of the signal light e.g.

scattered electromagnetic waves. This signal light is periodically modulated at the fundamental frequency $\Omega$. The interferometer phase is simultaneously modulated, preferably in a periodic manner at a different fundamental frequency M.

The first modulation ($\Omega$) applied to the signal light source distinguishes it from its surrounding (the background). The signal light—background light interference can be separated from the measured signal by the second modulation (M), applied to the interferometer phase, preferably by changing the optical path length of the reference light. This additional modulation also enables the simultaneous recovery of both the amplitude and phase of the signal light components.

The signal light may comprise e.g. light created by elastic scattering as e.g. in s-SNOM microscopy. In any case, the signal light is modulated at the fundamental frequency $\Omega$ by a modulation of the optical near-field interaction. According to an exemplary preferred application of the invention, the signal light comprises light scattered at a tip of an s-SNOM microscope wherein the microscope tip is subjected to an oscillation in the vicinity of the sample as it is known from conventional s-SNOM microscopy. The tip oscillation provides the modulation of scattered light at the fundamental frequency $\Omega$.

The signal light is characteristic for the modulated optical near-field interaction of a probe with an object. The term "probe" covers e.g. an aperture probe, a scattering probe, a single particle or even a single molecule as used in near-field investigation methods as a probe. The term "object" covers at least one of e.g. a sample surface, a single particle, a single molecule or a liquid including a particle under investigation.

The term "interferometer device" refers to any interferometer structure allowing superposition of the above signal light and background light with the reference light at the detector device. As an example, the interferometer device may comprise a Mach-Zender-interferometer. Particularly preferred is a Michelson-type interferometer, which advantageously permits a more compact assembly and easier alignment of the light beams.

Embodiments of the invention introduce several practical advantages over existing techniques, including even the above heterodyne scheme of Hillenbrand et al. (DE 100 35 134). Compared to the heterodyne approach, embodiments of the invention equally well eliminates the background contribution from the measured signal and also provides amplitude and phase information simultaneously. Unlike the heterodyne method, optical phase information is obtained independent of the mechanical tip oscillation phase.

Embodiments of the invention can be used for near-field microscopy throughout the visible and infrared spectrum without changing or realigning any components. In contrast to the heterodyne s-SNOM, simultaneous operation at several wavelengths including even broadband near-field spectroscopy is possible with this invention.

In contrast to the conventional Fourier transform spectroscopy, in embodiments of this invention the reference light is directed to the detector without an interaction of modulated reference light with either the probe or the object under investigation. This provides the optical phase sensitivity and even more importantly, interferometric signal amplification and background light elimination, not achievable with the conventional Fourier transform spectroscopy.

According to an exemplary preferred embodiment of the invention, an interferometer phase modulator is adapted for a periodic changing of the interferometer phase. This embodiment has particular advantages in terms of flexibility in recovering the signal light to be investigated. According to a particularly preferred embodiment, the interferometer phase modulator is adapted for a sinusoidal changing the reference light phase at a predetermined reference modulation frequency (M). In this case, the demodulation device is adapted for demodulating the detector signals at one or more frequencies equal to a sum or a difference between an integer multiple of the fundamental frequency $\Omega$ and an integer multiple of the interferometer modulation frequency M. As a particular advantage of this embodiment, the optical device can be operated at sub-MHz frequencies where the detectors and electronic devices are more accurate and substantially less expensive than at radio-frequencies required for the heterodyne method of Hillenbrand et al.

According to an alternative embodiment of the invention, the interferometer phase modulator is adapted for stepwise changing the interferometer phase. This embodiment may have particular advantages in terms of a targeted adjustment of sufficiently three interferometer phases.

According to a particularly preferred embodiment of the invention, the interferometer phase modulator is adapted for changing the interferometer phase according to a triangular function, and the demodulation device is adapted for determining signal light components by spectral analysis of the resulting interferograms. This embodiment has a particular advantage in that it enables multiline and broadband spectroscopy.

A further important advantage of the invention arises from the availability of different types of reference light phase modulators. Depending on the application and the particular structure of the optical set-up to be used, the interferometer phase modulator may comprise one or more of: at least one movable mirror, at least one electro-optic modulator, at least one fibre stretcher and at least one mirror-shutter-combination. Using of at least one movable mirror may comprise shifting at least one mirror along the reference light path of the interferometer device or rotating a mirror for deflecting the reference light path towards at least three mirrors defining the above reference light phases. Using the electro-optic modulator may have advantages in avoiding mechanical movement and vibrations as well as hysteresis commonly encountered with piezo-electric actuators.

Preferably, the optical device further comprises at least one light source for providing illumination light. The term "illumination light" generally refers to an irradiation in the above wavelength range, which illuminates the object under investigation.

According to a first variant, the light source may comprise at least one laser source emitting the illumination light. Preferably, the light source comprises two or more laser sources emitting at different wavelengths, which can be used for spectroscopic applications of the invention as outlined below. Furthermore, one laser source can be used for providing a pilot laser beam for adjustment purposes. In particular, measurements with invisible light are simplified with this embodiment since a visible pilot beam can pass through all the optical components, in contrast to the conventionally used infrared acousto-optic modulators, which are opaque to visible light.

According to a second variant of the invention, the light source comprises a broad band source, like e.g. a thermal radiation source or a femtosecond laser.

According to a further advantageous embodiment of the invention, the optical device further comprises light path length sensor. The sensor is adapted for sensing the current reference or signal light path length being imposed by the interferometer phase modulation. The provision of the sensor represents a particular advantage for reconstructing spatial interferograms and recovering the signal light using software-based algorithms.

The optical device according to embodiments of the invention can be used for obtaining background-free signal light components in each application where the signal light is characteristic for a particular feature of the object under investigation and the signal light is modulated with the above fundamental modulation $\Omega$. The preferred application has been found in near-field optical microscopy. Advantageously, a conventional near-field optical microscope easily can be adapted to the technique of the invention.

Accordingly, an independent aspect of the present invention is a near-field optical microscope comprising a probe tip being capable to be mechanically oscillated at a fundamental frequency near (e.g. above) a surface of a sample under investigation, at least one light source for generating the illumination light, and the above optical device according to the invention. In this case, the probe tip is coupled through a near-field interaction to the sample surface representing the object under investigation and the optical device of the invention is used for recovering signal light being scattered at the probe tip.

According to a second aspect of the invention, the above object is achieved with a method of determining at least one signal light component being characteristic for a property of an object to be investigated and having a fundamental modulation at a frequency $\Omega$.

Generally, the method according to an embodiment of the invention comprises the steps of illuminating the object with illumination light for providing the signal light and thereby also generating background light, superimposing the signal light and reference light split from the illumination light, detecting the superimposed signal light and reference light for obtaining detector output signals including signal light components of interest, and determining the signal light components by demodulating the detector output signals, wherein the interferometer phase is repeatedly changed and the detecting step includes a recording the detector outputs corresponding to at least three different interferometer states.

According to a particularly preferred embodiment of the invention, the interferometer phase modulation is achieved by the modulation of the reference light phase. In this case the phase of the modulated reference light electromagnetic wave at the detector position can be described by a function of time t, $\phi_R(t)=\omega t+\phi_{mod}(t)+\phi_0$, where $\omega$ is the circular frequency of the electromagnetic radiation, $\phi_{mod}$ is a predetermined function of time corresponding to the applied reference modulation, and the $\phi_0$ term is a constant phase offset determined by the exact geometry of the system. Preferably, $\phi_R(t)$ is a periodic function of time having a period T, corresponding to a fundamental frequency $M=1/T$.

The method according to an embodiment of the invention has an advantage in that various techniques for modulating the reference light are available, which can be selected in dependence on the requirements of a particular application. Correspondingly, the procedure for demodulating the detector signal is selected depending on the reference modulation method. The same applies to calibration and synchronization methods optionally provided for improving the signal processing.

Generally, three different general schemes are provided, depending on $\phi_{mod}(t)$, which can assume a sinusoidal, a triangular or a step-like form.

If the reference light phase is continuously changed according to the sinusoidal function, the amplitude and/or phase of the signal light can be preferably reconstructed from the detector signal by analyzing at least one sideband frequency for a predetermined integer multiple of the fundamental frequency $\Omega$. Advantageously, the side band frequency corresponding to at least one even and at least one odd multiple of the reference modulation frequency can be recorded and both the amplitude and phase of the signal light can be simultaneously determined.

If according to an alternative embodiment of the method of the invention, the reference light phase is changed according to a triangular function, the detecting step comprises recording interferograms of the superimposed signal and reference light at one or more non-zero integer multiples of the fundamental frequency $\Omega$, and the step of determining at least one of the amplitude and the phase of the signal components comprises a spectral analysis of the recorded interferograms. Advantageously, algorithms available from Fourier transform spectroscopy can be applied with this embodiment. If in practice the triangular function is not achievable or desired for performance reasons, the interferograms $I_n(t)$ can be reconstructed by simultaneous measurement of the detector output signal $I_n(t)$ and the corresponding position x(t) using the reference modulator position sensor.

According to a particularly preferred embodiment of the invention, the illumination light may comprise two or more different wavelengths. The multiple wavelength illumination according to the invention can be provided for at least one of the following purposes. Firstly, one of the illumination light wavelengths can be selected in the visible wavelength range so that the corresponding light component can be used for adjusting the optical device. As an example, a green or red pilot laser beam can be provided along with an infrared measurement beam. Additionally, the second light source might be used for an interferometric optical path sensor for the reference beam.

Furthermore, the broadband illumination allows a combination of a method of the invention with a complete spectral analysis of the sample under investigation.

Finally, additional information can be collected if one of the different illumination light sources is subjected to an additional amplitude modulation with frequency L. Spectral analysis of the corresponding interferograms obtained by subsequent detector output demodulation at the sum or difference of the amplitude illumination modulation frequency L and an integer multiple of signal light modulation frequency $\Omega$ allows a simultaneous stimulated fluorescence or Raman measurement in combination with optical near field microscopy.

If according to a further advantageous embodiment of the invention, the reference light phase is modulated according to a step function, the detecting step comprises a recording of a plurality of signals of the superimposed signal and reference light at a predetermined harmonic frequency $n\Omega$. In the simplest case, the step of recovering the signal components is facilitated as the signal light components can be determined by solving a system of three linear equations only.

Further details and advantages of the invention will be described in the following with reference to preferred embodiments of the invention illustrated in the Figures.

The following description of preferred embodiments of the invention refers to particular features of the optical device and the method for determining modulated signal light, which are provided for implementing the invention in practice. Details of optical components, like laser sources, detectors and signal processors as well as details of near-field microscopy are not described as far as they are known from prior art. The description of preferred embodiments refers to the application in near-field microscopy. It is emphasized that the principles of the invention can be applied in a way analogue to the measurements of modulated light in near-field microscopy, in particular for the applications outlined below.

Figure 1:
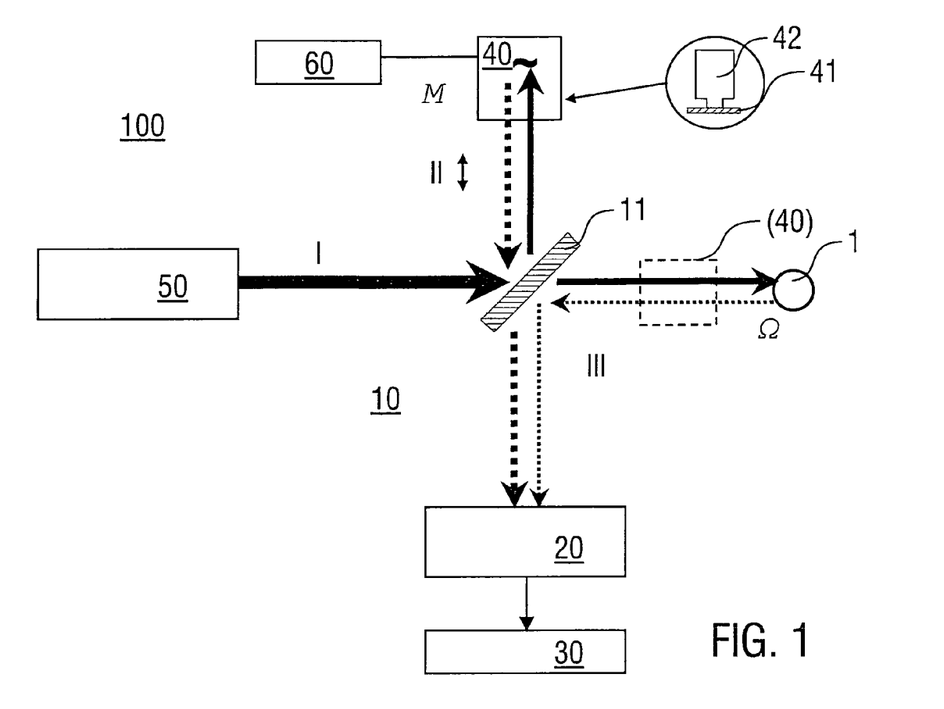
FIG. 1 is a schematic illustration of an optical device according to a first embodiment of the invention.

According to the embodiment schematically illustrated in FIG. 1, an optical device 100 according to the invention comprises an interferometer device 10, a detector device 20, a demodulation device 30, an interferometer phase modulator 40, a light source device 50 and optionally a reference light path sensor device 60.

The interferometer device includes a beam splitter 11 providing the following branches of the interferometer device. Firstly, an illumination light path I is directed from the light source device 50 to the investigated probe 1 acting as a modulated source of signal light, e.g. scattered light waves. A reference light path II is extending from the beam splitter 11 via the reference phase modulator 40, back to the beam splitter 11 and to the detector device 20. A part of the illumination light is split at the beam splitter 11 as reference light along the reference light path II. Finally, the signal light path III (measurement arm) is provided between the object 1 via the beam splitter 11 to the detector device 20. Signal light as well as background light from the probe 1 and the surrounding thereof is travelling along the signal light path III to the detector device 20, where it is superimposed with the reference light travelling along the reference light path II. The beam splitter 11 comprises an optical component like e.g. a semi-transparent mirror, a pellicle or wedge prisms.

The detector device 20 comprises e.g. a photomultiplier, a photodiode or an avalanche photodiode. The demodulation device 30 includes a calculation circuit for implementing the demodulation procedure according to one of the embodiments outlined below. The calculation circuit can be provided with a particularly adapted electronic circuit board or a computer, like e.g. a PC. The demodulation device 30 is connected with a control device (not shown) including interfaces for controlling or monitoring the function of the optical device 100.

The interferometer phase modulator 40 is adapted for a modulation of the optical path length difference between the reference light path II and the signal light path III. As an example, the interferometer phase modulator 40 comprises a plane mirror 41 being arranged perpendicular to the reference light path II and being connected with a piezoelectric drive 42 (see inset). With the piezoelectric drive 42, mirror 41 can be shifted to at least three different positions according to which the reference light has correspondingly three different phases. Other alternatives for embodying the modulator 40 are illustrated in FIGS. 3 to 6. As an example, the modulator can be arranged in the signal light path (as schematically shown with dotted lines, see also FIG. 8).

The light source device 50 comprises one or more narrowband or broadband sources being operated at one or more emission wavelengths or wavelength ranges of interest. As an example, one IR irradiation emitting laser, e.g. $CO_2$ laser or a free-electron laser is provided. Alternatively, the light source device 50 includes a broadband source emitting white light, like femtosecond pulsed laser or a thermal radiation source such as a silicon carbide globar or a tungsten filament lamp.

The reference numeral 60 refers to the schematically shown light path length sensor device being adapted for sensing at least one of the reference and the signal light path lengths according to the current status of the modulator 40. As an example, the reference light path sensor device 60 comprises at least one of the following sensor types: capacitive position sensors, strain gauge sensors or interferometric position sensor.

The optical device 100 is operated according to several prescriptions, in particular for the form of modulation applied to the reference wave phase and the recovery (demodulation) of the amplitude and phase of the light scattered by the probe 1. The principles of modulation and demodulation are outlined below. Furthermore, a determination of variable parameters pertaining to the interferometer phase manipulation ("calibration") and a synchronization of the probe fundamental modulation, the interferometer phase modulation and the demodulation are provided as outlined below. Additional synchronization with a possible scanning motion might be provided as well. In any case, the near-field interaction of the probe 1 with the object of investigation 5 is subjected to a modulation such that the signal light travelling along the signal light path III is modulated at the same frequency as well.

Figure 2:
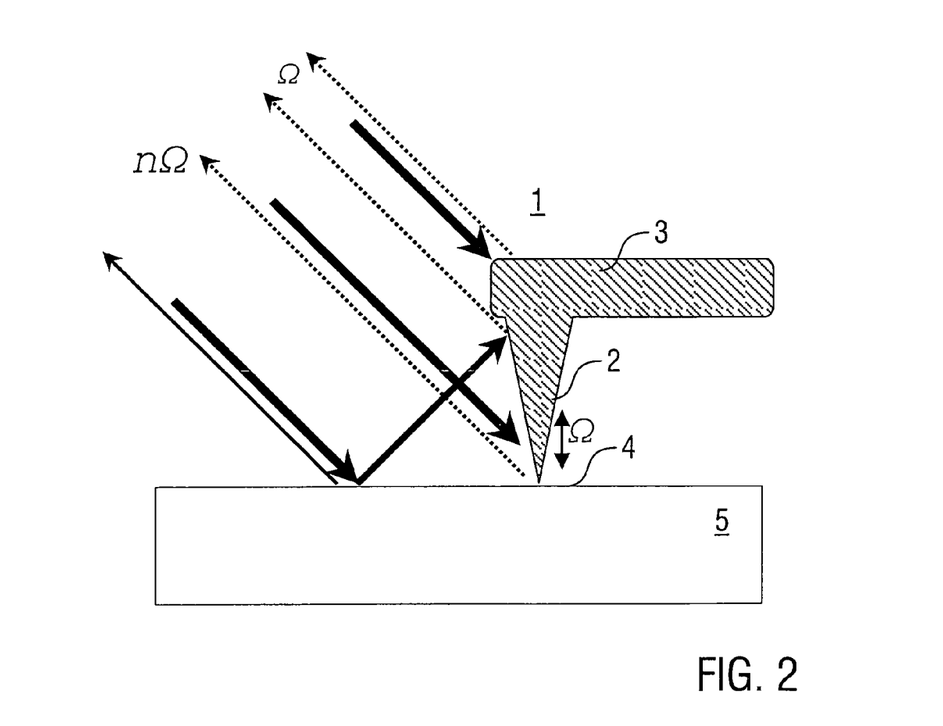
FIG. 2 is an illustration of the application of an embodiment of the invention in near-field microscopy.

With the application in near-field microscopy, the probe comprises the probing element 1 of an optical near-field microscope as illustrated in FIG. 2. For example, the probing element 1 comprises a tip 2 arranged on an oscillating cantilever 3 such that the tip 2 is directed to the surface 4 of a sample 5 to be imaged. The sample 5 represents the object to be investigated. The probing element 1 is oscillating with the fundamental frequency $\Omega$. The signal light influenced (e.g. scattered) by the probing element 1 is periodically modulated in its amplitude and/or phase. This modulation provides the possibility to distinguish even a largely subwavelength-sized source from the background.

Along with the fundamental modulation frequency $\Omega$, the signal light can contain its integer multiples $n\Omega$ ("higher harmonics") and a non-modulated ("DC") component. The DC component can hardly provide any information not contaminated by the background signal. On the contrary, the higher harmonics are often crucial for separating the small-object scattering from the background if the background is also modulated, as is the case e.g. in s-SNOM according to FIG. 2. The background light usually loses its intensity very quickly with the rising harmonic, so choosing a sufficiently high harmonic (n) allows the observation of the scattering from the investigated object alone. This, however, cannot be achieved by a simple interferometric detection of the modulated signal, even at a higher harmonic.

Since both the measured object light and background light are coherent with the incident illumination light, they interfere at the detector device 20. This interference with the background amplifies the investigated signal the same way the interference with a reference wave at the same frequency does.

Aspects of the present invention resolves the background interference problem by the additional modulation applied to the reference light wave. This second modulation separates the reference wave from the background. Furthermore, it enables the simultaneous amplitude and phase recovery.

The application of the embodiments of the invention are not restricted to the determination of scattered signal light but is possible also with other types of emission, like e.g. stimulated fluorescence or Raman emission, or even transmission. As an example, the signal light can comprise illumination light after passage through the object 1.

The interferometer phase modulator 40 illustrated in FIG. 1 is adapted for modulating the reference light phase according to a plurality of different procedures. These procedures comprise in particular the continuous modulation (type A), the discrete step-wise modulation (type B) and the triangular modulation (type C). Details of the modulation types A, B and C are described below. While the modulator 40 with the mirror 41 and the piezoelectric drive 42 according to FIG. 1 is suitable for all of the modulation types, further embodiments of reference phase modulators 40 are available being particularly adapted for one or two of the modulation types only. These embodiments are illustrated in FIGS. 3 to 6. The demodulation device 30 is not shown in these Figures.

Figure 3:
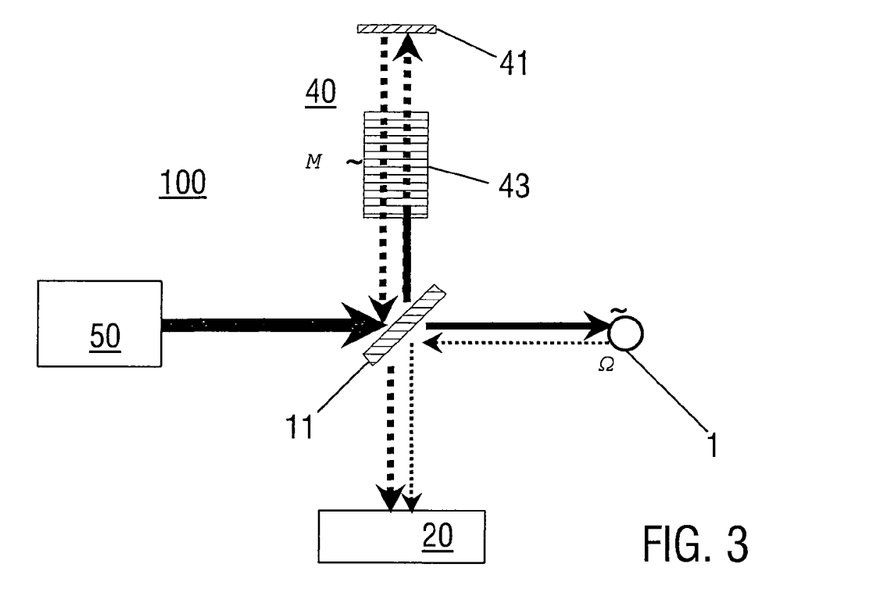
FIGS. 3 to 6 are schematic illustrations of optical devices according to further embodiments of the invention.

According to FIG. 3, the interferometer phase modulator 40 comprises a plane mirror 41 and an electro-optical modulator 43 arranged between the beam splitter 11 and the mirror 41. The electro-optic modulator comprises e.g. $LiNbO_3$ or $LiTaO_3$ crystal (manufacturer: Electro-Optical Products Corp., model EO-10). With the electro-optic modulator 43, an optical path length difference up to 10 μm can be obtained. Accordingly, the embodiment of FIG. 3 is particularly suited for the modulation types A and B.

Figure 4:
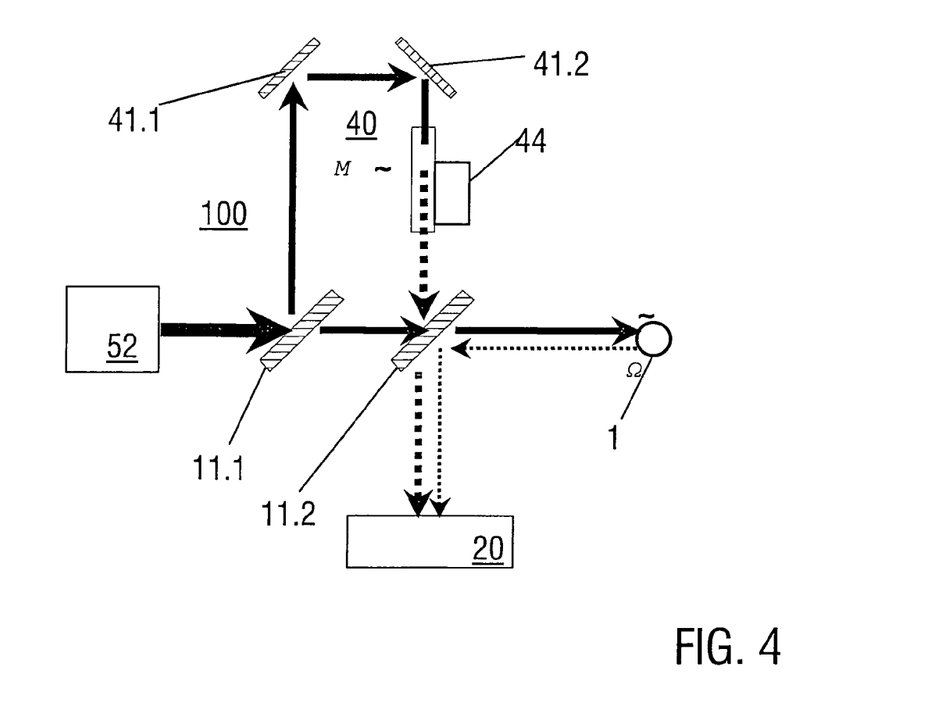

According to FIG. 4, the interferometer device 10 comprises two beam splitters 11.1 and 11.2 taking over the function of the above beam splitter 11. In this case, the illumination light path is extending e.g. from a laser source 52 via both beam splitters 11.1, 11.2 to the object 1, while the reference light path is extending from the first beam splitter 11.1 via two mirrors 41.1, 41.2, an optical fibre modulator 44 and the second beam splitter 11.2 to the detector device 20. The signal light path is found as in FIG. 1. The optical fibre modulator 44 comprises an optical fibre being stretchable with a piezoelectric drive.

FIG. 4 can be further modified by introducing a further optical fibre modulator and/or a further electro optic modulator in one of the branches of the reference light path, e.g. between the first beam splitter 11.1 and the first mirror 41.1. Accordingly, the optical path length interval can be increased.

Figure 5:
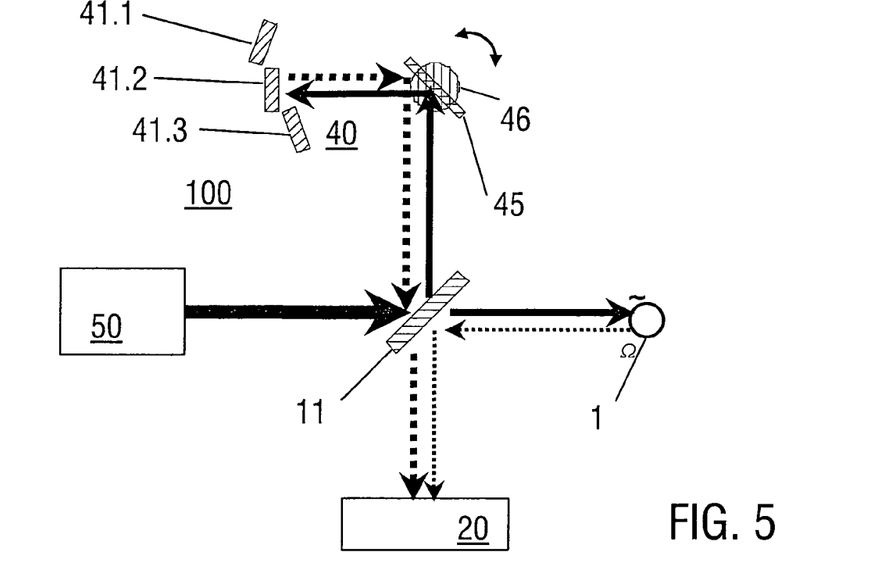

FIG. 5 illustrates an embodiment of the invention wherein the reference phase modulator 40 comprises a combination of a rotatable mirror 45 arranged on a piezoelectric rotator 46 with three plane end mirrors 41.1, 41.2 and 41.3. With this embodiment, reference light is travelling from beam splitter 11 via the rotatable mirror 45 to one of the end mirrors 41.1 to 41.3 depending on the current adjustment of the rotator 46. The mirrors 41.1 to 41.3 are positioned such that three different optical path lengths are provided for the reference light path. This embodiment is particularly suited for the modulation procedure type B outlined below. If more than 3 reference phases are to be adjusted for data collection, further end mirrors are provided correspondingly.

Figure 6:
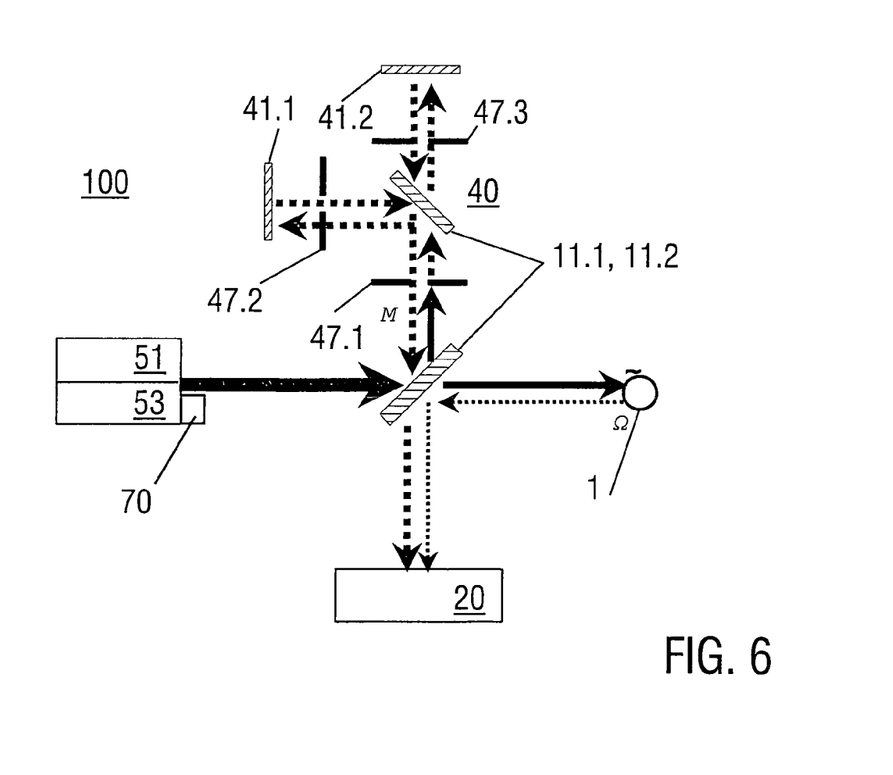

With the embodiment according to FIG. 6, the reference phase modulator 40 comprises a mirror-shutter-combination with 3 optical shutters 47.1, 47.2 and 47.3 and two end mirrors 41.1, 41.2. Depending on the state of the shutters 47.1 to 47.3, three different reference light path states can be set, which include two different reference light phases and a condition wherein the reference light path is blocked. This embodiment is particularly suited for the modulation procedure B.

Furthermore, FIG. 6 illustrates the provision of two laser sources 51, 53 as the laser source device. Both laser sources 51, 53 are operated with different emission wavelengths. One of the laser sources, e.g. laser source 53 is provided with an amplitude modulator 70 for implementing the triple modulation (type D) outlined below. The amplitude modulator 70 comprises e.g. an acousto-optic modulator, a Pockels or a Kerr cell.

The procedure for demodulation of the signal is selected depending on the type of reference phase modulation. The same applies to the calibration and synchronization methods. The choice of suitable light sources and electronic equipment is also related to the reference modulation method.

The general schemes A to C differ with regard to the phase modulation $\phi_{mod}(t)$, which can preferably assume a periodic, in particular a sinusoidal, discrete-step or a triangular form. In each case the following description of types A to C is given for a single harmonic (n), but in an actual application any number of harmonic components can be measured simultaneously in the same way e.g. by using a plurality of lock-in amplifiers, a demultiplexer and a multi-channel data acquisition board or by decomposition of the detector output signal by digital downconverters or software-based algorithms. A demultiplexer may consist of e.g. low-pass filters following balanced mixers or precision multipliers mixing the detector output signal with a sine wave signal harmonically derived from the fundamental modulation frequency $\Omega$ by a phase-locked loop.

Type A: Sinusoidal Modulation

Modulation

Generally, the type A modulation comprises a continuous, periodic changing of the reference light phase.

Figure 7:
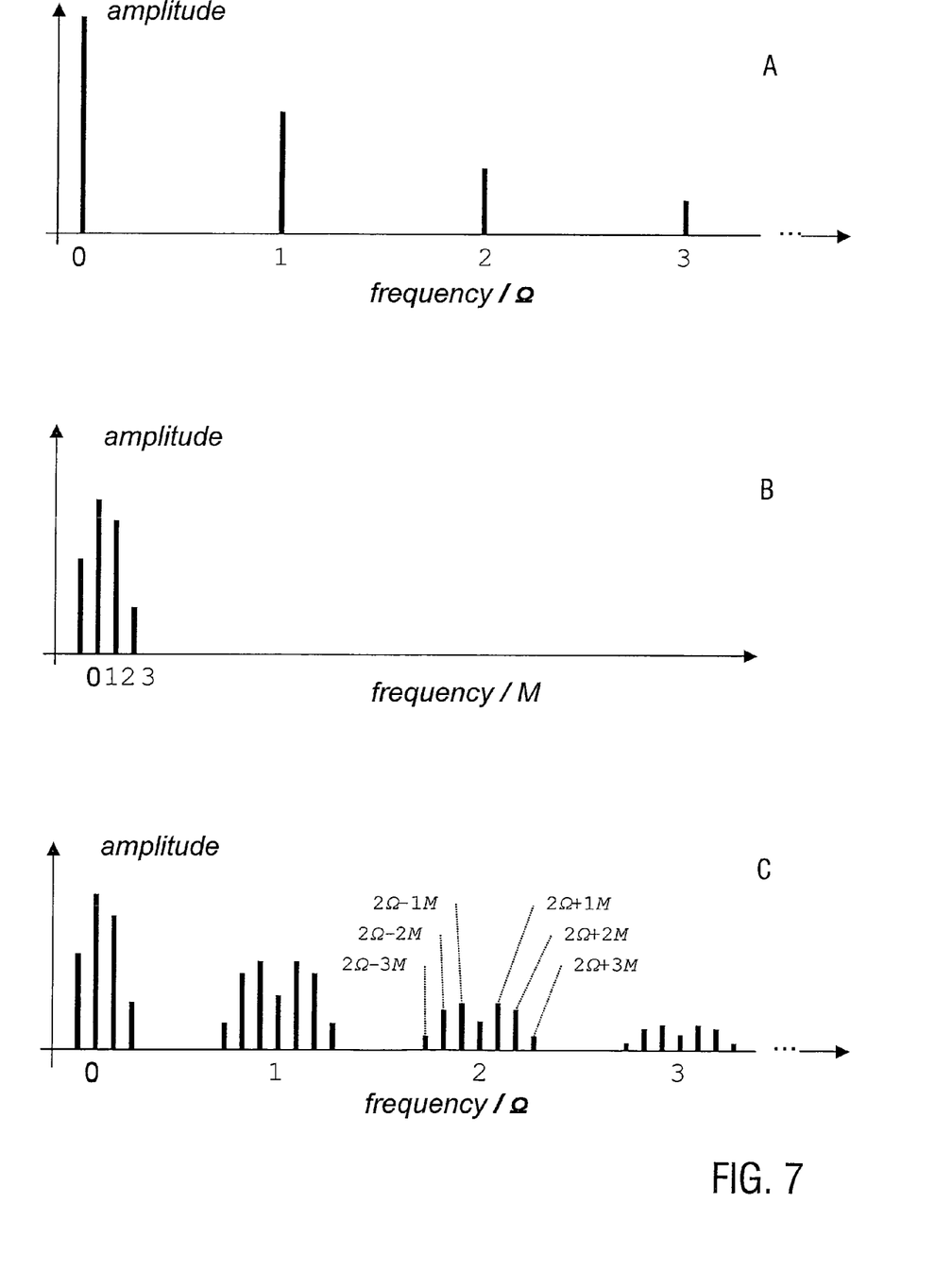
FIG. 7 is a graphic representations of signal spectra produced with an exemplary method of the invention.

FIG. 7 shows signal, reference and detector output spectra illustrating the modulation and demodulation steps with the sinusoidal modulation. FIG. 7A shows the harmonic components of the signal light modulation frequency $\Omega$ (n=0, 1, 2, 3, ...). The fundamental frequency $\Omega$ is selected in the range of typically 5 kHz to 5 MHz (n=1). FIG. 7B shows the optical frequency components of the sinusoidal reference modulation frequency M (n=0, 1, 2, 3, ...) for the case M<$\Omega$. The superposition of both modulations yields the detected interference spectrum according to FIG. 7C having peaks at the harmonics of fundamental frequency $\Omega$ each with sideband maxima corresponding to the harmonic components of the modulation frequency M. In the case M>$\Omega$ the roles of M and $\Omega$ are reversed, i.e. the bands are centred around multiples of reference modulation frequency M and harmonics of $\Omega$ are located in their sidebands.

If the reference phase is sinusoidally modulated, it can be formally represented as $\phi_{mod}(t)=\gamma \sin(2\pi M t)$ with $\gamma$ being the modulation depth and M modulation frequency.

Such modulation can be achieved e.g. by reflecting the reference beam off an oscillating mirror 41 driven by a piezoelectric or magnetic actuator 42 (FIG. 1), passing the reference beam through an electro-optic phase modulator (FIG. 3) or through an optical fibre stretched by a piezoelectric actuator (FIG. 4).

Sinusoidal modulation causes the detector output signal at the n-th harmonic (frequency n$\Omega$) to be split into sidebands with frequencies $f_{n,m}=|n\Omega \pm mM|$, as illustrated in FIG. 7C. The exact measured amplitude $s_{n,m}$ of the signal at the frequency $f_{n,m}$ is given by:

$s_{n,m}=aE_{S,n}E_R J_m(\gamma)\cos(m\pi/2+\phi_{S,n}-\phi_{0,n})$ where m is an integer sideband index, $E_{S,n}$ and $\phi_{S,n}$ the scattered wave n-th harmonic amplitude and phase, $E_R$ is the reference wave amplitude and $\phi_{0,n}$ is a phase offset determined by the geometry and can be set to zero for practical purposes. $J_m$ is the Bessel function of the first kind, m-th order and a is detector sensitivity.

It should be noted that if the sinusoidal phase modulation is applied to the signal light instead of the reference light, the background supression power of the method is reduced due to the presence of an unmodulated background light component.

Demodulation

According to the previous explanation, the even-m and odd-m sidebands correspond to the signal light cosine and sine components, respectively. By measuring one odd (m') and one even (m") sideband signal, both the amplitude and phase information can be retrieved. $J_m(\gamma)$ must be known, and a $E_R$ can be measured or simply neglected as it represents a multiplicative constant only.

The choice of lowest possible m' and m" is usually preferred since it allows for the smallest modulation depth $\gamma$. Yet m" must not be zero as this signal would appear exactly at the frequency $n\Omega$, thus overlapping with the background interference product.

Once m' and m" are chosen and $J_k$ is known, the scattered wave n-th harmonic amplitude can be reconstructed from $s_{n,m'}$ and $s_{n,m''}$:

$$E_{S,n} = sqrt((s_{n,m'}/J_1)^2 + (s_{n,m''}/J_2)^2)/aE_R$$

where $J_1=J_{m'}(\gamma)$ and $J_2=J_{m''}(\gamma)$. The n-th harmonic phase $\phi_{S,n}$ is given by:

$$\phi_{S,n} = \arctan(s_{n,m'}/J_1, s_{n,m''}/J_2)$$

As long as the amplitudes $a_{n,k}$ are considered non-negative, the phase will be located in the first quadrant only, i.e. $\phi_n = 0 \ldots \pi/2$. To extend the phase to entire $0 \ldots 2\pi$ range, the correct signs for the amplitudes $a_{n,k}$ must be taken into account. Depending on the implementation, they might be calculated implicitly or with the aid of an external reference signal.

Simultaneous measurement of several sidebands (e.g. m' and m" together with –m' and –m") and subsequent averaging can be employed to increase signal-to-noise ratio.

The demodulation can also proceed in two steps. If $M<\Omega$, in the first step the detector output is demodulated at a multiple of signal light modulation frequency ($n\Omega$), thereby effectively shifting the frequency $n\Omega$ to zero. In the second step the amplitudes at one of more integer multiples of the reference modulation frequency M (mM) are extracted from the signal obtained after the first step. The result of two-step demodulation, first at the frequency $n\Omega$ then at mM is the same as the direct demodulation at $n\Omega+mM$. For the case of $M>\Omega$, the detector output should be first demodulated at one or more reference modulation harmonics (mM) and then at the chosen signal light modulation harmonic ($n\Omega$).

Calibration

For the above expressions to be usable, the factors $J_1$ and $J_2$ must be known in advance. For fixed m' and m" they depend on the modulation depth $\gamma$. In the case when the exact phase shifts of the reference wave are known, this reduces to evaluating the corresponding Bessel functions $J_m$. Such possibility exists e.g. if a piezoelectric actuator is used for modulation and operated in close-loop mode, or with an calibrated electro-optic modulator.

If the exact modulation depth is not known, it is still possible to determine $J_1$ and $J_2$ by applying an offset $\phi_0$ to the reference wave phase and changing it slowly to find maximum values of $s_{n,m'}$ and $s_{n,m''}$. Those will be found within the offset range of at most 180 degrees. The ratio $J_1/J_2$ is then equal to $\max(s_{n,m'})/\max(s_{n,m''})$. This ratio alone suffices for relative scattering measurements. If the absolute measurements are to be performed, the modulation depth can be determined numerically by searching for the value $\gamma$ at which the calculated $J_1/J_2$ equals the measured one.

Finally, for the optimal performance (maximal worst-case signal-to-noise ratio) it is advantageous to enforce $J_1=J_2$. This can be achieved by adjusting the modulation depth $\gamma$ until a value is found at which the sum $s_{n,m'}^2 + s_{n,m''}^2$ remains unchanged by application of an arbitrary phase offset $\phi_0$ to the reference wave. If m'=1 and m"=2, this will first happen at $\gamma=2.63$ with $J_1=J_2=0.462$.

Synchronization

The modulation type A does not require explicit synchronization with a possible scanning. The source and reference wave modulation must only be synchronized with the measurement of the signal if the full $0 \ldots 2\pi$ phase range is desired. In that case two options are available:

a) An external reference signal can be provided to the lock-in detector or a digital data acquisition (DAQ) system at the exact measured frequency and with the correct phase. Such signal can be derived e.g. by mixing the signal or "sync" outputs from generators driving the scattering source and reference wave modulations.

b) Both modulations must be generated by phase-locked generators, and a digital data acquisition system should be used. If the sampling proceeds phase-locked with the modulation, the correct sign of the amplitudes $a_{n,m}$ can be calculated. Furthermore, by imposing certain fixed integer ratios between scattering source modulation, reference wave modulation and sampling time, the phase rotation of the demodulated signal complex amplitudes $a_{n,k}$ can be avoided and their signs directly extracted.

Type B: Discrete (Stepwise) Modulation

Modulation

The reference phase is switched through a series of discrete steps, formally represented as $$\phi_{mod}(t) = \phi_i \text{ for } t_{i-1} \leq (t \bmod T) < t_i$$

with $\phi_i$ being the phase within the interval i, i=1 ... N and T is the fundamental modulation period. The interval end times $t_i$ are subject to constraint $t_0=0$, $t_N=T$. In most cases the intervals will be of equal duration. At least three different steps are required to reconstruct the complex-valued scattering amplitude and eliminate the background contribution.

Such discrete-step modulation can be achieved e.g. by using electrically deflection mirrors (FIG. 5) or actuated shutters (FIG. 6) to switch the reference beam between different mirrors. A fast electro-optical modulator (FIGS. 3, 8) can also be used or a piezoelectric actuator with high resonance frequency and a light mirror attached to it (FIG. 1).

Figure 8:
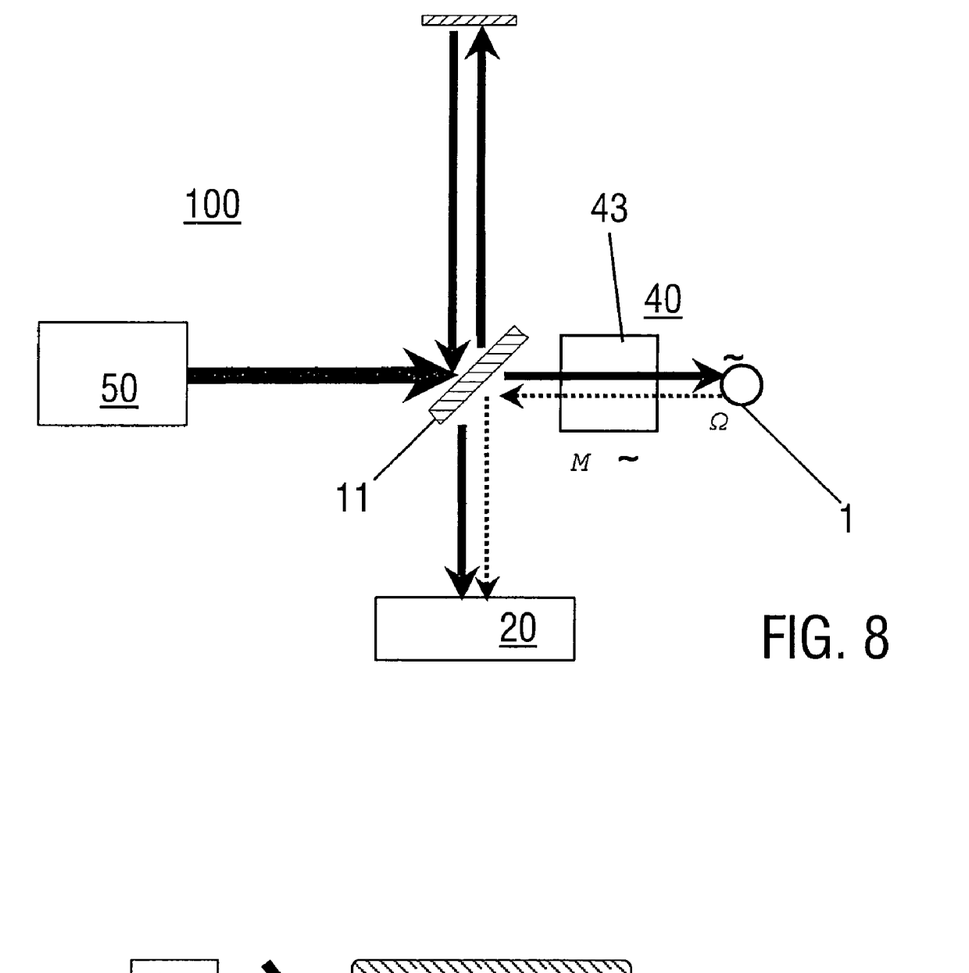
FIG. 8 is a schematic illustration of an optical device according to a further embodiment of the invention.

The signal light phase can be modulated instead or in addition to the reference light phase with no loss in background suppression power. According to this embodiment shown in FIG. 8, the interferometer phase modulator 40 comprises an electro-optical modulator 43 arranged between the beam splitter 11 and the object 1. The electro-optic modulator comprises e.g. LiNbO$_3$ or LiTaO$_3$ crystal (manufacturer: Electro-Optical Products Corp., model EO-10). With the electro-optic modulator 43, an optical path length difference up to 10 μm can be obtained. Accordingly, the embodiment of FIG. 8 is particularly suited for the modulation types B and C (see below). Alternatively, the signal light phase can be modulated by replacing the modulator 43 by a mirror combination as shown in FIG. 4, which allows a setting of optical path length.

Demodulation

The detection of the signal proceeds at the chosen harmonic frequency $n\Omega$. After recording, the signal is first divided into intervals i with the constant reference phase. The subsequent averaging over each interval yields the amplitudes $s_i$. Since it is practically impossible to realize infinitely sharp transitions between the steps, the signal recorded during the transitions should be discarded.

Neglecting the pure scattered wave intensity, the detected signal is equal to $$s_n = aE_{S,n}(E_B \cos(\phi_{S,n}-\phi_B) + E_R \cos(\phi_{S,n}-\phi_R)),$$

where a is the detector sensitivity and $E_{S,n}$ and $\phi_{S,n}$ the scattered wave n-th harmonic amplitude and phase $E_R$ and $E_B$ are the reference wave and the background signal amplitudes and $\phi_B$ and $\phi_R$ their corresponding phases. With $a_n = a E_{S,n} E_R$ and $b = E_B/E_R \cos(\phi_{S,n}-\phi_B)$ the above expression can be shortened to $$s_n = a_n(b + \cos(\phi_{S,n}-\phi_R))$$

Since the reference phase $\phi_R$ cycles through a set of known discrete values $\phi_i$ and the corresponding values of $s_n$ are the measured, only three unknowns remain: $a_n$, b and $\phi_{S,n}$. With N=3 measurements, $a_n$ and $\phi_{S,n}$ are obtained by solving the system of simultaneous equations of the above form. With N>3 the system is overdetermined and a fit can be used.

As a special case a situation can be considered in which one of the intervals, $i_o$, represents the measurement with the reference beam completely blocked (FIG. 6). The background term $a_n$ b is then immediately equal to $s_{i_o}$ and can as such be subtracted from the other measured values. This case might be interesting for practical implementations as it imposes less stringent requirements on the transition time between the neighbouring two intervals.

Calibration

The modulation type B involves cycling through several pre-determined states, usually at relatively low frequency. This enables the simple calibration of the desired reference phases in a static situation or operation in a closed-loop mode.

Synchronization

If the signal light phase in the full $0 \ldots 2\pi$ range is to be obtained, the demodulation should proceed in phase with the modulation. This can be easily accomplished by using the signal driving the source modulation as the reference for a lock-in amplifier performing the demodulation. In order to minimize the number of transition between the reference phase states and therefore the measurement time, the reference wave modulation period should coincide with the pixel time if scanning is involved.

Type C: Triangular Modulation

Modulation

The reference phase can be described by a "triangular" function of the form:

$$\phi_{mod}(t) = \gamma |2(t \bmod T)/T - 1| + \phi_0$$

with $\gamma$ being the modulation depth, T the modulation period and $\phi_0$ an offset determined by interferometer geometry.

Such modulation can be achieved by the same means as the sinusoidal modulation, i.e. by reflecting the reference beam off an moving mirror driven by a piezoelectric or magnetic actuator (FIG. 1), passing the reference beam through an electro-optic phase modulator (FIG. 3) or through an optical fibre stretched by a piezoelectric actuator (FIG. 4).

If the required modulation depth $\gamma$ is much larger than 1 rad, the choice might be limited to moving mirror solutions.

Such extensive modulation with $\gamma \gg 1$ rad is necessary for broadband spectroscopy in conjunction with pulsed laser or thermal sources. For operation involving a single laser line or several lines from different spectrally well separated lasers, the $\gamma$ factor on the order of unity is usually sufficient.

If the sufficiently good triangular modulation form is not attainable or desired for performance reasons, it is acceptable to change the reference light phase according to a different, more convenient function, provided that for each detector output value the actual reference modulator position or reference light phase is known or measured. For determining the reference phase, e.g. a capacitive or strain-gague type position sensor can be used, as well as an optical (interferometric) distance measurement system.

As with the case of stepwise modulation, the reference phase modulation can be substituted or complemented by the signal light phase modulation (as shown in FIG. 8) of the same period with no particular disadvantage apart from the possible increase in the implementation complexity.

Demodulation

To reconstruct the n-th harmonic amplitude $E_{S,n}$ and phase $\phi_{S,n}$ of the scattered light, the detector output signal on the frequency $n\Omega$ must be recorded. Assuming perfect triangular modulation with a known velocity, the recorded time trace of the signal can be directly translated into an interferogram $I_n(x)$. It suffices to take just one side of the triangle for an interferogram.

If the modulation function deviates from the triangular form but the exact reference phase is known for each detector output signal recorded, the interferogram can be easily reconstructed, e.g. by calculating the proper index of every measured point into a pre-allocated array of points equidistant in reference phase. Alternatively, an interpolating function can constructed form the measured (signal, position) pairs.

If the phase change deviates from the ideal case just in a small region around the turning points of the triangular motion, the signal recorded near the turning points can be simply discarded at the expense of small loss in frequency resolving power.

Once a spatial interferogram $I_n(x)$ is properly constructed by any of the above means, the discrete Fourier transform (DTF) or an equivalent procedure (Fast Fourier transform, Görtzel algorithm) can be applied to obtain its complete or partial spectral decomposition. The zero-frequency (DC) component of the transform contains the background interference product. The desired amplitude $E_{S,n}$ and phase $\phi_{S,n}$ of the scattered light are directly contained in the corresponding complex Fourier coefficient. For a given total phase stroke $\gamma$ and a N-point DFT, this coefficient can be found at the distance of $i = \gamma/(N \pi)$ bins away from the zero frequency.

This procedure works equally well even with several wavelengths at the same time. The care must be taken to provide phase strokes large enough to resolve single components and to make sampling dense enough to avoid spectral aliasing. It is important to note that the phase stroke $\gamma$ depends on the light wavelength $\lambda$. It can be obtained from the known total optical path difference d as $\gamma = d/\lambda$.

The same principle can be applied to spectrally broad sources such as femtosecond pulsed lasers or incandescent lamps. In this case the optical distances traversed by the reference and the measurement beam must be equal for an interference to take place.

Calibration

The relatively long modulation periods usually allow for a closed-loop operation or modulation pre-calibrated in a static situation. The total phase stroke needs not be known for single-line operation as it can be found by searching for a spectral maximum occurring at a non-zero frequency.

Synchronization

Detection (by a lock-in amplifier or a DAQ board) must be synchronized by standard procedures with the source modulation. To reduce the reference modulation frequency and phase stroke to the minimum, it could be synchronized to the scanning motion. In particular, one pixel in the resulting image should be obtained from one triangle side.

Type D: Triple Modulation

Modulation

Triangular modulation method (type C) enables simultaneous operation with several completely independent laser lines. It represents the basis for the triple (type D) modulation method. In addition to the type C modulation operating with at least two light sources, an additional intensity modulation at a frequency L is imposed on one of the light sources, which must be a laser source emitting light of wavelength $\lambda_1$.

Demodulation

The signal light in triple modulation (type D) scheme is recovered from an interferogram just as in the case of type C demodulation. Additionally to or instead of the type C interferograms obtained at frequency $n\Omega$, the interferograms should be recorded at a frequency $|L \pm n\Omega|$.

Spectral analysis of the interferograms obtained at the frequency $|L \pm n\Omega|$ will show no signal corresponding to any illumination wavelength $\lambda_2 \neq \lambda_1$ if only elastic processes take place.

However, if the wavelengths $\lambda_1$ and $\lambda_2$ correspond to excitation and emission wavelength of a fluorescent compound, or if their photon energy difference coincides with the transition energy to some vibrational state of the investigated material, the crosstalk between lines $\lambda_1$ and $\lambda_2$ can appear through stimulated fluorescence or Raman emission. The strength of this effect can be directly read out from the spectral component corresponding to the illumination wavelength $\lambda_2$ extracted from the said interferogram constructed from the detector output demodulated at the frequency $|L \pm n\Omega|$.

This way scattering-type near-field microscopy can be combined with Raman or fluorescence microscopy in a single device. In particular, when the required fundamental object modulation is induced by a sharp tip dithered above the sample, the field enhancement on the tip apex can be used to increase the Raman or fluorescence yield. Further enhancement can be obtained by placing the sample on a substrate with $Re(\in) \approx -1.7$ thereby exploiting the near-field resonance effect.

APPLICATIONS OF THE INVENTION

Figure 9:
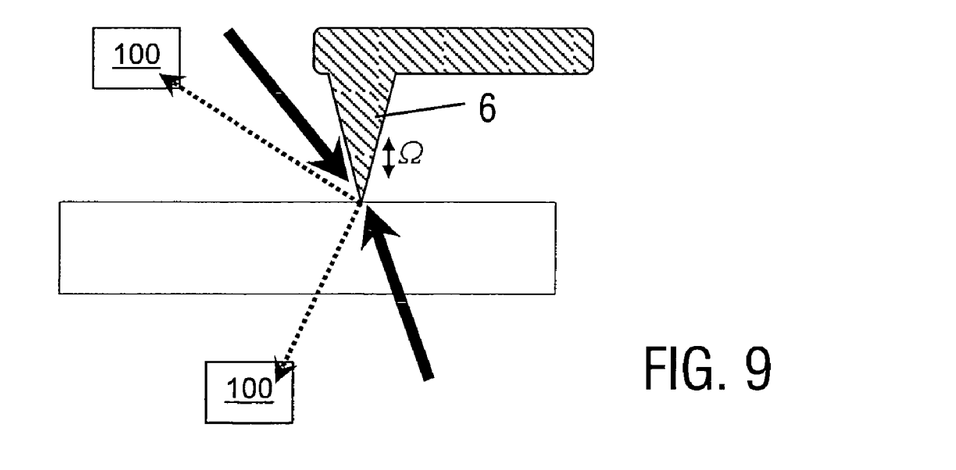
FIGS. 9 to 11 are schematic illustrations of various applications of the invention.
Figure 10:
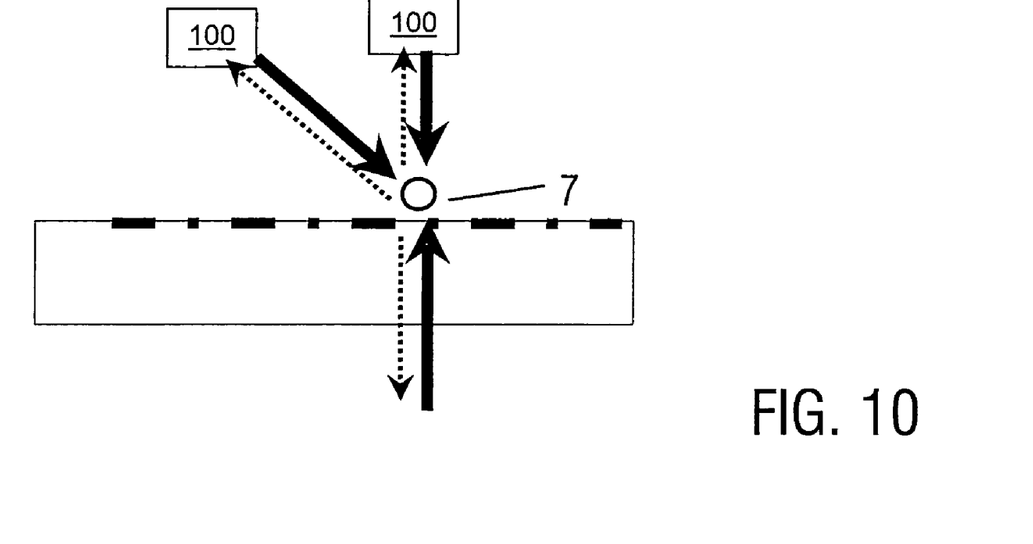
Figure 11:
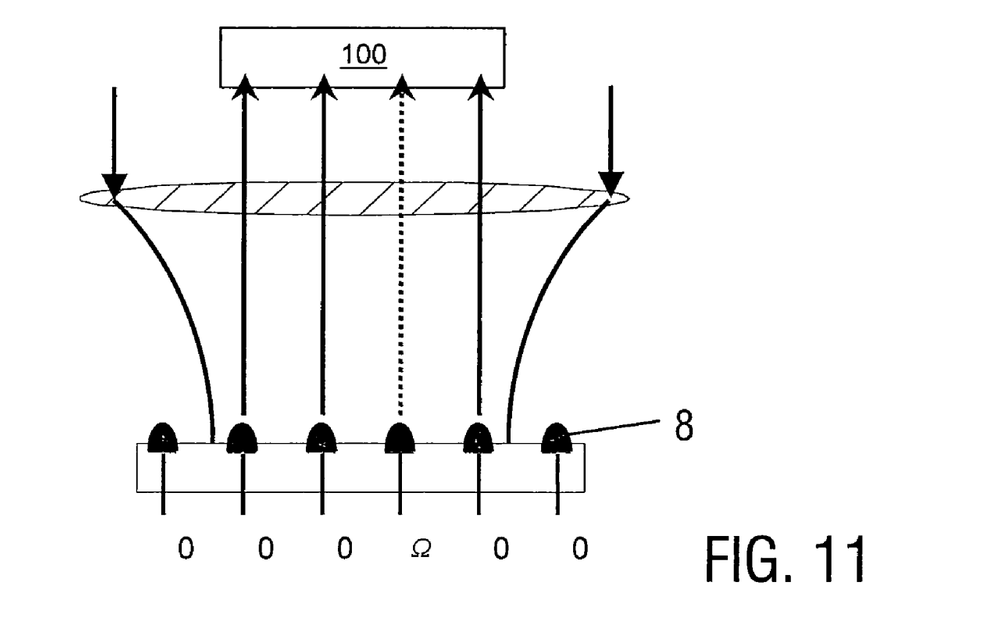

Generally, signal light components detected according to embodiments of the invention are preferably stored, recorded, displayed, and/or output. Apart from the special case of s-SNOM (FIGS. 2, 9), the invention is applicable for any other near-field measurements, like e.g. with nano-particles, single molecules or quantum dots, transistors and memory cells. Other possible applications include information retrieval from a high density optical data storage medium 7 (FIG. 10) or from a densely packed chemical or biological sensor array 8 (FIG. 11). Furthermore, FIGS. 9 to 11 illustrate various alternatives for arranging the optical devices 100 relative to the object 1.

The features of the invention as disclosed in this description, in the claims and in the drawings can be of significance both individually as well as in random combination for the realization of the invention in its various embodiments.

The invention claimed is:

1. An optical device for determining at least one signal light component being characteristic for an optical near-field interaction of a probe with an object to be investigated, wherein the near-field interaction is subjected to a fundamental modulation at a fundamental frequency $\Omega$, said optical device comprising:
   an interferometer device including
      an illumination light path (I) being directed to the probe,
      a reference light path (II) being directed to a detector device for obtaining detector output signals including signal light components, wherein the reference light path (II) does not contain the probe, and
      a signal light path (III) being directed from the probe to the detector device, wherein the reference and signal light paths (II, III) are superimposed at the detector device,
   a demodulation device for determining the signal light components by demodulating the detector output signals, and
   an interferometer phase modulator, which is arranged in at least one of the reference light path (II) or signal light path (III) for changing an interferometer phase comprising the optical phase difference between the reference light and the signal light, wherein
   the demodulation device is adapted for determining the signal light components from the detector output signals obtained at three or more different interferometer states, which represent three or more different interferometer phases or at least two different interferometer phases with at least one state wherein the reference light path (II) is blocked.

2. An optical device according to claim 1, wherein the interferometer phase modulator includes a drive device being adapted for continuously changing the interferometer phase.

3. An optical device according to claim 2, wherein the drive device is adapted for periodically changing the interferometer phase at a interferometer modulation frequency M and the demodulation device is adapted for demodulating the detector signals at one or more frequencies equal to a sum or a difference between a non-zero integer multiple of the fundamental frequency $\Omega$ and an integer multiple of the interferometer modulation frequency M.

4. An optical device according to claim 1, wherein the interferometer phase modulator includes a drive device being adapted for stepwise changing the interferometer phase and the demodulator device is adapted for demodulating the detector output signal at a non-zero integer multiple of the fundamental frequency $\Omega$.

5. An optical device according to claim 1, wherein the interferometer phase modulator comprises at least one of a movable mirror, an electro-optic modulator, a fibre stretcher and a mirror-shutter-combination.

6. An optical device according to claim 5, wherein the at least one movable mirror comprises at least one of a mirror shiftable along a light path or a rotatable mirror in combination with at least three mirrors defining different interferometer phases.

7. An optical device according to claim 5, wherein the interferometer phase modulator comprises an electro-optic modulator being arranged for multiple passages of light.

8. An optical device according to claim 5, wherein the interferometer phase modulator comprises at least two mirror-shutter-combinations.

9. An optical device according to claim 1, wherein the demodulator device comprises at least one of: a balanced mixer, an analog multiplier, a lock-in amplifier, a data acquisition board, a digital downconverter and a digital electronic circuit capable of performing Fast Fourier Transform.

10. An optical device according to claim 1, further comprising:
at least one light source for generating the illumination light.

11. An optical device according to claim 10, wherein the at least one light source comprises a laser, a synchrotron or a thermal radiation source.

12. An optical device according to claim 10, wherein the at least one light source further includes an adjustment laser source.

13. An optical device according to claim 1, further comprising:
a light path length sensor device for sensing at least one of the reference and the signal light path length.

14. A near-field optical microscope, comprising:
a probe tip being capable to be mechanically oscillated at a fundamental frequency $\Omega$ near the surface of a sample under investigation,
at least one light source for generating illumination light, and
an optical device according to claim 1 for determining signal light being scattered by the probe tip.

15. A method of determining at least one signal light component being characteristic for an optical near-field interaction of a probe with an object to be investigated, wherein the near-field interaction is subjected to a fundamental modulation at a fundamental frequency $\Omega$, comprising the steps of:
illuminating the probe with illumination light for providing signal light,
superimposing the signal light and reference light,
detecting the superimposed signal and reference light for obtaining detector output signals including signal light components,
determining the signal light components by demodulating the detector output signals, and
changing an interferometer phase with an interferometer phase modulator, the interferometer phase comprising the optical phase difference between the reference light and the signal light, wherein
the probe is not illuminated with reference light, and
the detecting step comprises demodulating the detector output signals at three or more different interferometer states, which represent three or more different interferometer phases or two different interferometer phases with one state wherein the reference light path (II) is blocked.

16. A method according to claim 15, wherein the step of changing the interferometer phase comprises a continuous changing the interferometer phase.

17. A method according to claim 15, wherein the interferometer phase is continuously changed according to a periodic function having a interferometer modulation frequency M and the demodulating step comprises a demodulating of the detector signals at one or more frequencies equal to a sum or a difference between a non-zero integer multiple n of the fundamental frequency $\Omega$ and an integer multiple of the interferometer modulation frequency M.

18. A method according to claim 17, wherein the interferometer phase is continuously changed according to a periodic function composed of at least one sinusoidal function.

19. A method according to claim 18, wherein the at least one of the amplitude and the phase of the signal light is reconstructed from at least one even and at least one odd multiple of the interferometer modulation frequency M for a predetermined integer multiple of the fundamental frequency $\Omega$.

20. A method according to claim 18, wherein the at least one signal light component is reconstructed by the steps of:
demodulating the detector output signal at a multiple of the fundamental modulation frequency $\Omega(n\Omega)$ for obtaining an intermediate signal, and subsequently
extracting amplitudes at one of more integer multiples of the interferometer modulation frequency M (mM) from the intermediate signal.

21. A method according to claim 18, wherein the at least one signal light component is reconstructed by the steps of:
demodulating the detector output signal at one or more integer multiples of the reference modulation frequency M (mM) for obtaining one or more intermediate signals and subsequently, and
extracting amplitudes at a multiple of the fundamental modulation frequency $\Omega(n\Omega)$ from one or more said intermediate signals.

22. A method according to claim 17, wherein the integer multiple n is selected to be $|n| \geq 2$.

23. A method according to claim 15, wherein the detecting step comprises a recording of interferograms of the superimposed signal and reference light at one or more non-zero integer multiples of the fundamental frequency $\Omega$, and the step of determining at least one of the signal light components comprises a spectral analysis of the interferograms.

24. A method according to claim 15, wherein the illumination light comprises a plurality of different wave-lengths.

25. A method according to claim 23, further comprising the step of intensity modulating one illumination light source at a modulation frequency L, and the step of demodulating the detector output signals includes recording the interferograms at one or more frequencies equal to a sum or a difference between a non-zero integer multiple of the fundamental frequency $\Omega$ and the intensity modulation frequency L.

26. A method according to claim 15, wherein the step of changing the interferometer phase comprises a step-wise changing the reference light phase, the detecting step comprises a recording detector output at three or more interferometer phases at a predetermined harmonic frequency $n\Omega$, and the step of determining the signal components comprises solving an equation system including a plurality of representations of the recorded signals.

27. A method according to claim 15, further comprising the step of sensing at least one of the reference and the signal light path length with a light path sensor device or with an adjustment laser beam.

28. A method of determining at least one signal light component being characteristic for an optical near-field interaction of a probe with an object to be investigated, wherein the method according to claim 17 is simultaneously applied for a plurality of different predetermined integer multiples n.

29. A method of using an optical device according to claim 1 for:
near-field microscopy,
optical read-out of stored data, or
reading out sensor arrays.

30. A method of using a method according to claim 15 for:
near-field microscopy,
optical read-out of stored data, or
reading out sensor arrays.

* * * * *

UNITED STATES PATENT AND TRADEMARK OFFICE
CERTIFICATE OF CORRECTION

| | | |
|---|---|---|
| PATENT NO. | : 7,738,115 B2 | Page 1 of 1 |
| APPLICATION NO. | : 11/997386 | |
| DATED | : June 15, 2010 | |
| INVENTOR(S) | : Ocelic et al. | |

It is certified that error appears in the above-identified patent and that said Letters Patent is hereby corrected as shown below:

On the Title Page:

At (86), please change the §371(c)(1), (2), (4) date from "Jan. 30, 2008" to --February 12, 2008--

Signed and Sealed this

Thirtieth Day of November, 2010

David J. Kappos
*Director of the United States Patent and Trademark Office*